(12) United States Patent
Lin

(10) Patent No.: US 8,295,628 B2
(45) Date of Patent: Oct. 23, 2012

(54) AUTOMATIC FILM GRAIN ADJUSTMENT

(75) Inventor: Shu Lin, San Diego, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 981 days.

(21) Appl. No.: 12/308,435

(22) PCT Filed: Jun. 21, 2006

(86) PCT No.: PCT/US2006/024327
§ 371 (c)(1),
(2), (4) Date: Dec. 15, 2008

(87) PCT Pub. No.: WO2007/149085
PCT Pub. Date: Dec. 27, 2007

(65) Prior Publication Data
US 2010/0238353 A1 Sep. 23, 2010

(51) Int. Cl.
*G06K 9/40* (2006.01)
*H04N 5/00* (2006.01)
*H04N 5/14* (2006.01)
*H04N 9/64* (2006.01)
*H04N 9/74* (2006.01)

(52) U.S. Cl. ........ 382/254; 382/275; 348/576; 348/578; 348/607; 348/622

(58) Field of Classification Search ............... 382/254, 382/275; 348/576, 578, 607, 622
See application file for complete search history.

(56) References Cited

U.S. PATENT DOCUMENTS

| | | | |
|---|---|---|---|
| 5,436,979 A | 7/1995 | Gray et al. | |
| 5,475,425 A | 12/1995 | Przyborski et al. | |
| 5,641,596 A | 6/1997 | Gray et al. | |
| 5,687,011 A | 11/1997 | Mowry | |
| 6,067,125 A | 5/2000 | May | |
| 6,130,741 A | 10/2000 | Wen et al. | |
| 6,269,180 B1 | 7/2001 | Sevigny | |
| 7,978,896 B2 * | 7/2011 | Kimura | 382/131 |
| 2002/0034337 A1 * | 3/2002 | Shekter | 382/275 |
| 2004/0264795 A1 * | 12/2004 | Fielding | 382/254 |
| 2006/0133686 A1 * | 6/2006 | Gomila et al. | 382/254 |
| 2006/0215767 A1 * | 9/2006 | Gomila et al. | 375/240.25 |
| 2006/0256853 A1 | 11/2006 | Schlockerman et al. | |
| 2007/0036452 A1 * | 2/2007 | Llach et al. | 382/254 |
| 2007/0104380 A1 * | 5/2007 | Gomila et al. | 382/239 |

(Continued)

FOREIGN PATENT DOCUMENTS

GB 2386494 9/2003

(Continued)

OTHER PUBLICATIONS

Gomila et al., "SEI Message for Fillm Grain Encoding", JVT of ISO/IEC MPEG & ITU-T VCEG, Document: JVT-H022, 8th Meeting: Geneva, CH, May 23-27, 2003.

(Continued)

*Primary Examiner* — Aaron W Carter
(74) *Attorney, Agent, or Firm* — Robert D. Shedd; Robert B. Levy

(57) ABSTRACT

An inventive method obtaining film grains from a picture and processing the obtained film grains using a statistical distribution to determine new film grains. Preferably, a histogram of obtained film grain is subjected to the statistical distribution, which can be a normal distribution. Parameters of the normal distribution are controlled to determine the new film grains.

18 Claims, 1 Drawing Sheet

U.S. PATENT DOCUMENTS

| | | | | |
|---|---|---|---|---|
| 2007/0140588 A1* | 6/2007 | Balram et al. | | 382/275 |
| 2007/0269125 A1* | 11/2007 | Llach et al. | | 382/254 |
| 2007/0297515 A1* | 12/2007 | Gomila et al. | | 375/240.18 |
| 2008/0152250 A1* | 6/2008 | Gomila et al. | | 382/260 |
| 2008/0192817 A1* | 8/2008 | Llach et al. | | 375/240.01 |
| 2009/0290808 A1* | 11/2009 | Ishiga | | 382/261 |

FOREIGN PATENT DOCUMENTS

| | | |
|---|---|---|
| GB | 2390772 | 1/2004 |
| JP | 9-508507 | 8/1997 |
| JP | 2001144950 | 5/2001 |
| JP | 2005-080301 | 3/2005 |
| JP | 2005/080301 | 3/2005 |
| WO | WO2004104931 | 12/2004 |
| WO | WO2005027045 | 3/2005 |
| WO | WO2005032143 | 4/2005 |
| WO | WO2005034517 | 4/2005 |

OTHER PUBLICATIONS

Gomila et al., "Film Grain Modeling vs. Encoding", JVT of ISO/IEC MPEG & ITU-T VCEG, Document: JVT-K036, 11th Meeting: Munich, DE, Mar. 15-19, 2004.

Gomila, "SEI Message for Film Grain Encoding: Syntax and Results", JVT of ISO/IEC MPEG & ITU-T VCEG, Document: JVT-1013r2, 7th Meeting: San Diego, CA, Sep. 2-5, 2003.

Campisi, P. et al., "Signal-Dependent Film Grain Noise Generation Using Homomorphic Adaptive Filtering," iEE Proc, Image Signal Process, vol. 147, No. 3, Jun. 2000.

Collis, B. et al., "Synthesising Film Grain," Institute of Sound and Vibration Research, 2004 The Institution of Electrical Engineers, IEE, Michael Faraday House, Herts, UK, pp. 231-234.

Hill, K.O., "Holographic Noise Levels in Two Silver Halide Recording Media," Optica Acta, vol. 18, No. 10, Oct. 1971, pp. 729-742.

Hunt, B.R., "Bayesian Methods in Nonlinear Digital Image Restoration," IEEE Transactions on Computers, vol. C-26, No. 3, Mar. 1977, pp. 219-229.

Smith, D.A.: "Low Loss Surface Imaging and Transmission Microscopy of Growth of Some Thin Films," Applications of Surface Science, vol. 11-12, Jul. 1982, pp. 131-143, Netherlands.

International Search Report, dated Mar. 21, 2007.

* cited by examiner

AUTOMATIC FILM GRAIN ADJUSTMENT

FIELD OF THE INVENTION

This application claims the benefit, under 35 U.S.C. §365 of International Application PCT/US2006/024327 filed Jun. 21, 2006, which was published in accordance with PCT Article 21(2) on Dec. 27, 2007 in English.

BACKGROUND OF THE INVENTION

When film or negative is developed, the tiny crystals of Silver Halide salts are turned into tiny filaments of metallic silver. These filaments are grouped together in random patterns and form grains. The size of the crystals of silver halide salts is different for different speed film stocks. Normally, the higher the speed the greater the size of the crystal is. For example, ISO 200 rated film is twice as sensitive as a film rated ISO 100. Other film ratings include ISO400, ISO800, ISO1600 and ISO3200, etc. Normally, film speed is inversely related to granularity, the size of the grains of silver halides in the emulsion. A fine-grain stock is slow, meaning that the amount of light used to expose it must be high. Fast films used for shooting in poor light produce a grainy image. The image actually consists of a mosaic of developed and undeveloped areas of the emulsion, and each grain of silver halide develops in an all-or-nothing way. If the subject has an edge between light and darkness and that edge falls on a grain, the result will be an area that is all light or all shadow. Graininess is an accumulation of these areas of all light or all shadow that break up the visible contours of the image. An area of the image will consist of bright areas and dark areas with few transitional areas of mid tones. In the early 1980s, there were some radical improvements in film stock. It became possible to shoot color film in very low light and produce a fine-grained image with a good range of mid tones. In advertising, music videos, and some drama, it is fashionable to create mismatches of grain, color cast, and so forth between shots. These mismatches of grain are deliberate and sometimes are added in post-production.

Current techniques for simulating film grains are directed to adding film grains for still pictures. These techniques are not flexible and not automatic. Further, current film grain simulating techniques do not provide a good mechanism to remove film grain and add back controllable film grain automatically. A known film grain management technique for hard drive-digital video disc (HD-DVD) creates a lookup table for film grain that can be easily applied to audio-video coding, i.e., AVC codec. In hard drive digital video disc applications, the encoder removes the film grains as well as some picture details depending on the bit rate. This film grain management technique does not precisely calculate the grain level and does not automatically characterize the film grain. A film processing technique that can determine film grain patterns or levels automatically is needed.

SUMMARY OF THE INVENTION

An inventive method includes obtaining film grains from a picture and controlling filtering of a statistical distribution of the obtained film grains to determine film grains different from the obtained film grains. Preferably, controlling the filtering includes setting filtering parameters to automatically obtain a desired grain pattern for any picture. The statistical distribution is a normal distribution of the noise representative of the obtained film grain. Controlling the filtering includes adjusting parameters for one of a 2×2 filter, noise sharpening filter and band pass filter to determine film grains with grain patterns wanted.

In another aspect of the invention, an apparatus includes means for obtaining film grains from a picture and means for controlling parameters of a filtering of statistical distribution of the obtained film grains to determine film grains different from the obtained film grains. Preferably, the means for controlling parameters of a filtering includes setting filtering parameters to automatically obtain a desired grain pattern for any picture. The means for controlling parameters of a filtering includes adjusting parameters for one of a 2×2 filter, noise sharpening filter and band pass filter to determine film grains with grain patterns wanted. The statistical distribution can include a normal distribution of the obtained film grains.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

In developed film, tiny crystals of silver halide salts are turned into tiny filaments of metallic silver. These filaments are grouped together in random patterns and form grains. The size of the crystals of silver halide salts is different for different speed film stocks. Normally, the higher the speed of the film stock the greater the size of the silver halide crystals. A movie can be shot in different environments, such as day and night, sunny and raining, and different speed film stocks are used. The film grains appear differently through out the film, which must be corrected in post production. The film stocks used to take movies years ago have a more grainy appearance when viewed, than current film stock. As a result, the earlier film when viewed appears too noisy. These early films need to be reconstructed for today's display devices.

The inventive film grain processing generates film grain automatically and matches the resulting film grain pattern with what is wanted. The invention processes the extracted film grain to meet desired grain pattern and level requirements. The process can be automatic and a controller can set the level of the grain or the pattern of the grain. This automatic film grain adjustment provides a convenient and powerful tool for film post-production and film restoration.

Figure 1:
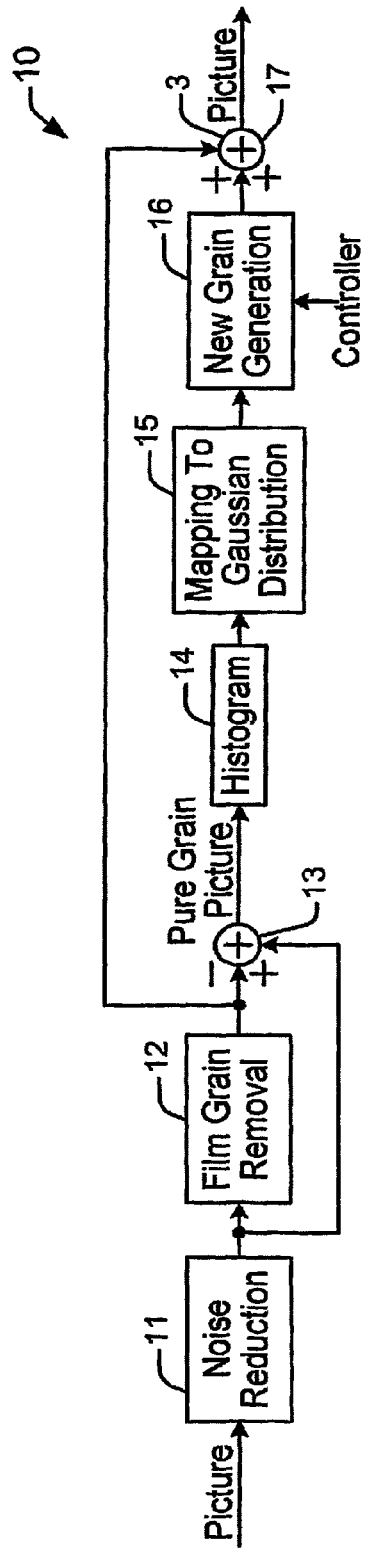
FIG. 1 is a diagram of film grain level and pattern management in accordance with the invention.

Referring now to the block diagram 10 of FIG. 1, after a picture passes through a noise reduction block 11 the noise in the picture is reduced. The noise-reduced picture goes through the film grain remover 12, and the output has less grains. Normally, low pass filters are used to reduce the noise and remove film grains. Picture details are also reduced. A good filter such as a content based Gaussian Noise Reduction filter can minimize the reduction in picture detail. A small modification made to this filter can make it suitable for multiple loops. For a color picture film grain pattern, each color component is filtered. The grain-removed picture is subtracted 16 from the noise-reduced picture to obtain a pure grain picture.

The resulting pure grain picture, which only has film grains and no picture content, is subjected to a film grain pattern processing stage of histogram 14, normal or Gaussian distribution mapping 15 and new grain generation with parameters of the normal distribution set to obtain desired grain patterns and gain levels 16. A histogram 13 of the pure grain picture is calculated. The histogram of the pure grain picture is then mapped to a Gaussian distribution 14 to find the corresponding standard deviation with zero mean. The one dimensional 1-D Gaussian probability density function is $$G(x) = \frac{1}{\sqrt{2\pi}\,\sigma} e^{-\frac{x^2}{2\sigma^2}}$$

where $\sigma$ is the standard deviation of the distribution. It is assumed that the distribution has a mean of zero. The Gaussian distribution is used to calculate a new set of film grains 15. The parameters of the Gaussian distribution are set by the controller. In other words, after the pure grain picture is calculated for each component, the histogram of each component is calculated. For each component, the histogram is used to find out the standard deviation. As an example, three points are checked, at half a standard deviation $P(0.5\sigma)=0.2398$, at a full standard deviation $P(1.0\sigma)=0.0786$, and at one and a half times the standard deviation $P(1.5\sigma)=0.0169$. For example, at $x=2.35$, $P=0.2398$, then $\sigma=2*x=4.70$, and similar to $P=0.0786$, and $P=0.0169$. The final $\sigma$ is their average. By using the calculated $\sigma$, Gaussian distribution, and an auto-regressive model, a set of Gaussian random noise can be generated. The controller inputs the wanted film grain pattern and level. This set of noise can be filtered with different ways to match the required grain pattern. For example, a 2×2 mean filter can been used, followed by a noise sharpening filter. Band pass filters can also be used. The film grains are further adjusted with the contents because the grains are different at different picture intensities. The newly generated film grains 15 are added 17 back to the film grain-removal output 12 picture to create a new picture 3 with new or controlled film grains.

Figure 2:
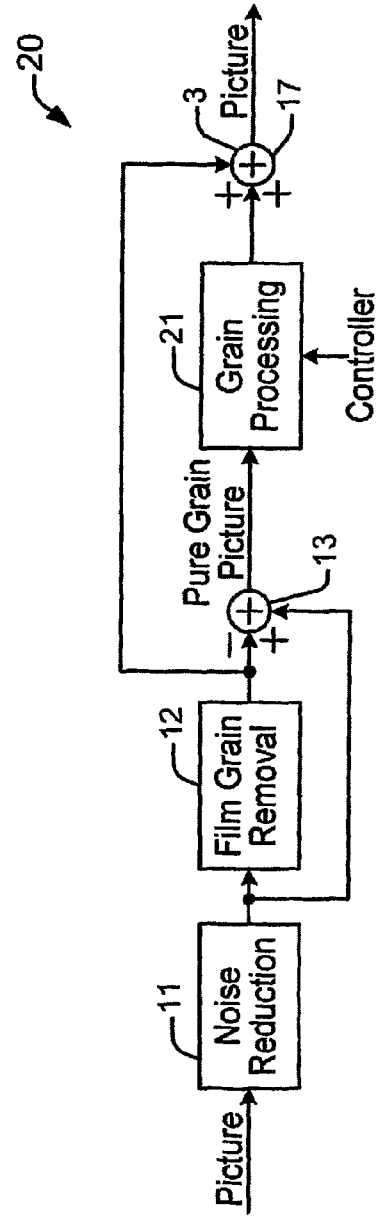
FIG. 2 is a diagram of film grain level management in accordance with the invention.

Another aspect of this invention is shown in the block diagram 20 of FIG. 2. If the overall film grain pattern of the incoming picture is acceptable, and yet may be too weak or too strong, then a new set of film grains may not be required. After the film grain extracted is from the film 12, the film pure film grain picture can be processed 21 to either make the film grain level stronger or weaker, as dictated by the controller. The processed film grain is then added back to the picture with film grain removed to create a new picture 3 with wanted levels of film grains.

Having described a preferred embodiment for the automatic film grain adjustment, it is noted that modifications and variations can be made by persons skilled in the art in light of the above teachings. For example, alternative statistical distribution techniques can be employed on the histogram output of the pure grain picture. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. A method for automatically managing film grain for post production, comprising the steps of:
   obtaining film grains from a picture by subtracting a grain-removed picture from a noise-reduced picture; and
   controlling filtering of a statistical distribution of the obtained film grains to determine film grains different from the obtained film grains.

2. The method of claim 1, wherein the step of controlling the filtering comprises setting filtering parameters to automatically obtain a desired grain pattern for any picture frame of a film.

3. The method of claim 2, wherein the statistical distribution is a normal distribution of the noise representative of the obtained film grains.

4. The method of claim 1, wherein the step of step of controlling the filtering comprises adjusting parameters for one of a 2×2 filter, noise sharpening filter and band pass filter to determine a wanted film grain pattern.

5. The method of claim 1, wherein the step of controlling the filtering comprises finding a standard deviation with zero mean of the obtained film grains to determine film grains different from the obtained film grains.

6. The method of claim 1, further comprising the step of adding the different film grains to the picture with the obtained film grains removed to generate a picture with a new film grain pattern.

7. The method of claim 2, wherein the step of obtaining the film grains from a picture comprises reducing noise from a picture.

8. The method of claim 7, wherein the step of obtaining film grains from a picture comprises removing film grain from the noise reduced picture.

9. The method of claim 1, wherein the different film grains have grain patterns and grain levels different from the obtained film grains.

10. An apparatus for automatically managing film grain for post production, comprising:
    means for obtaining film grains from a picture by subtracting a grain-removed picture from a noise-reduced picture; and
    means for controlling parameters of a filter for filtering of a statistical distribution of the obtained film grains to determine film grains different from the obtained film grains.

11. The apparatus of claim 10, wherein the means for controlling parameters of the filter for filtering the statistical distribution comprises setting means for setting filtering parameters to automatically obtain a desired grain pattern for any picture frame of a film.

12. The apparatus of claim 10, wherein means for controlling parameters of the filter comprises means for adjusting parameters for one of a 2×2 filter, noise sharpening filter and band pass filter to determine film grains with one of grain patterns and grain levels.

13. The apparatus of claim 10, wherein the statistical distribution comprises a normal distribution of the obtained film grains.

14. The apparatus of claim 10, wherein the filter for filtering the statistical distribution finds a standard deviation with zero mean of the obtained film grains to determine film grains different from the obtained film grains.

15. The apparatus of claim 10, further comprising means for adding the different film grains to the picture with the obtained film grains removed to generate a picture with new film grains.

16. The apparatus of claim 10, wherein the means for obtaining film grains from a picture comprises means for reducing noise from a picture.

17. The apparatus of claim 16, wherein the means for obtaining film grains from a picture comprises means for removing film grain from the noise reduced picture.

18. The apparatus of claim 10, wherein the different film grains have a grain pattern and grain level different from that of the obtained film grain.

* * * * *